Patented Apr. 2, 1929.

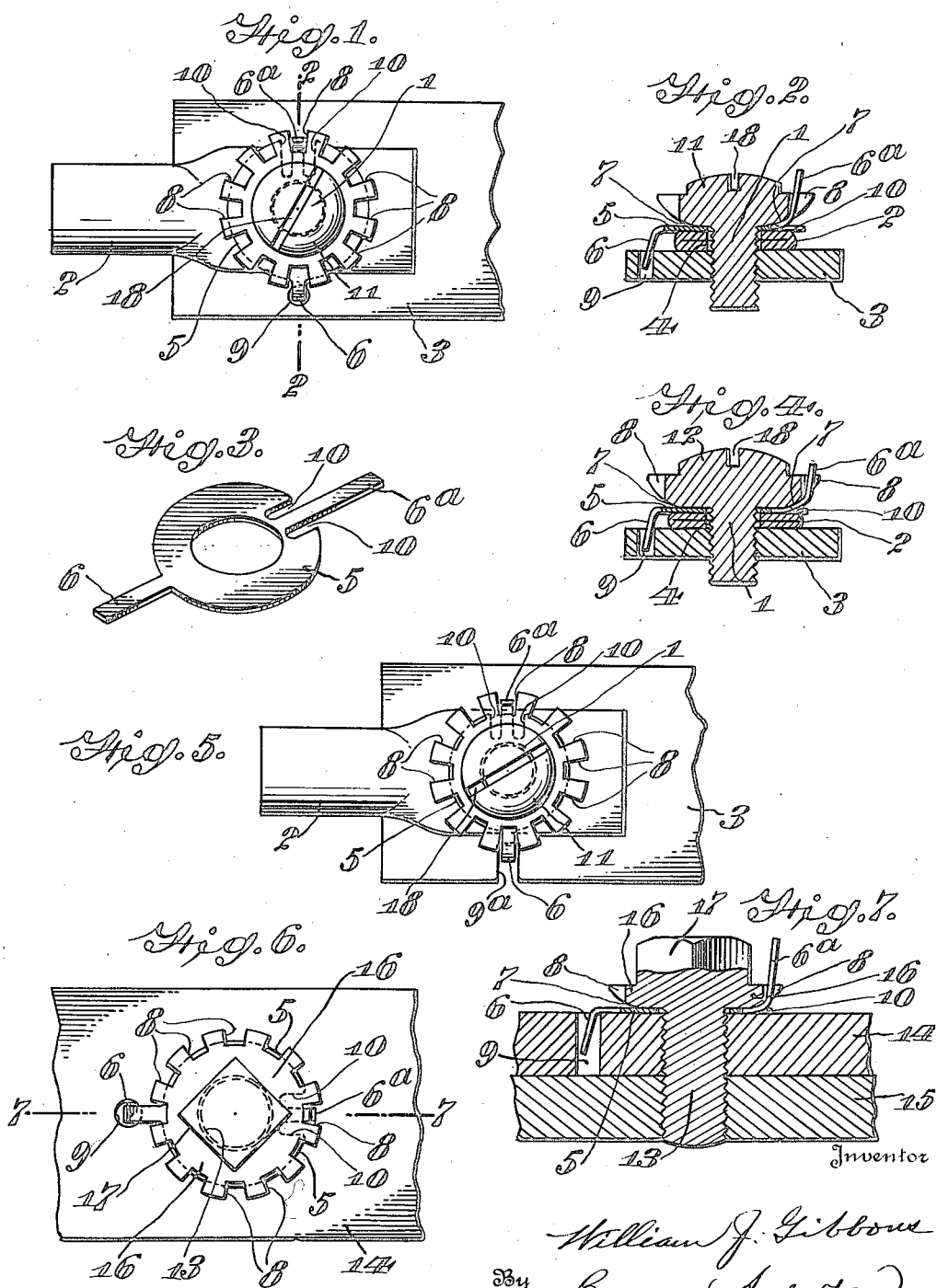

1,707,933

UNITED STATES PATENT OFFICE.

WILLIAM J. GIBBONS, OF PHILADELPHIA, PENNSYLVANIA.

LOCKING DEVICE FOR SCREWS AND THE LIKE.

Application filed June 1, 1928. Serial No. 282,098.

My invention relates to a locking device, and while capable of being employed for fastening nuts and bolts, it is of especial utility in fastening screws and screw-bolts against rotation.

More specifically my invention relates to metal lock washers which are provided with tongues adapted to be bent into contact with a nut or the head of a bolt or screw to prevent rotation thereof. In the manufacture of such lock washers it has been found to be desirable to produce a washer which is capable of being employed in fastening screw heads, screw-bolt heads and nuts of different sizes. Heretofore it has been necessary to manufacture washers of different diameters having tongues of different lengths for engaging and locking devices which vary in size.

The general object, therefore, of my invention is to provide a lock washer of novel character which is so constructed that it may be employed in fastening nuts of different sizes or screws and screw-bolts having heads of different sizes.

A further object of my invention is to provide a locking device comprising a washer of novel construction having tongues thereon, the said washer being adapted to be interposed between the head of a screw or screw-bolt and the member to which the screw is attached, one of said tongues engaging the screw or bolt-head and the other being attached to the said member to secure the screw or bolt against rotation, the said screw being so constructed as to prevent the fracture of the tongue of the lock washer which is bent into engagement therewith.

It is also an object of my invention to provide a locking device which is adapted to be employed for fastening screws or screw-bolts having heads of different sizes, which screws or bolts are so constructed as to reduce the possibility of fracture of the portions of the locking device which are bent into contact therewith.

Other objects and advantages of the invention will be pointed out in the following description or will be apparent from such description.

In order to more fully comprehend the invention reference may be had to the accompanying drawing in which I have illustrated certain embodiments thereof, but it is to be understood that various changes in the details of construction may be made therein without departing from the invention as defined in the claims.

In the drawing:

Fig. 1 represents a top plan view of electric contact devices secured together by means of a screw provided with the locking means embodying my invention;

Fig. 2 is a longitudinal sectional view taken on the line 2—2 of Fig. 1;

Fig. 3 is a view in perspective of the locking device associated with the head of the screw in Fig. 1;

Fig. 4 is a longitudinal sectional view which is identical with Fig. 2 except that the screw is provided with a head of larger diameter;

Fig. 5 is a top plan view of a modification of the construction shown in Fig. 1 embodying the locking means of my invention;

Fig. 6 is a top plan view of another modification of the construction illustrated in Fig. 1 embodying my novel locking device; and Fig. 7 is a view in longitudinal section taken on the line 7—7 of Fig. 6.

While my improved locking device is capable of being employed for the purpose of fastening nuts and bolts to prevent them from being rotated I have illustrated said device as being applied to the head of a screw.

In the drawing, the numeral 1 designates a screw which is adapted to clamp an electric terminal 2 of usual construction to a plate 3 by being inserted through an opening 4 formed in the said terminal and screwed into a tapped opening in the said plate. The plate 3 may constitute a portion of an electric switch structure or the like. In order to prevent the screw 1 from being rotated after the terminal has been clamped in position a lock washer consisting of an annulus of thin metal designated generally as 5 having an opening therein to receive the shank of the screw is interposed between the head of the said screw and the adjacent portion of the electric terminal. The lock washer is provided with tongues 6 and 6ª, the latter of which is adapted to be bent upwardly against the rounded portion 7 of the screw head and into one of a number of slots 8 which are cut in the edge of the head of the screw. The tongue 6 is adapted to be bent and projected into an opening 9 formed in the plate 3 adjacent the screw 1, and when the tongues are so adjusted it will be impossible for the screw 1 to rotate and to become loosened.

The rounded portion 7 of the screw head is adapted to prevent the tongue 6ª from being bent too sharply, thereby preventing crystallization and fracture of the said tongue which otherwise would result from the frequent bending thereof which takes place when the lock washer and screw are employed in making electric connections. A further advantage of the rounded outer edge of the under side of the screw head resides in the fact that it is only necessary to bend the tongue 6ª a short distance in fastening and unfastening the screw, thereby further reducing the possibility of fracture of the said tongue and lengthening the life of the washer.

Ordinarily in the manufacture of lock washers of the type illustrated in Fig. 3 of the drawing it is necessary for the manufacturer to keep on hand a large variety of sizes of lock washers of the same internal diameter but of different external diameters corresponding to the external diameters of nuts and bolts or screws having heads of different sizes. In order to reduce the expense of maintaining such a supply of washers I have devised a novel construction of means embodying a lock washer which is adapted to be employed in lieu of a large number of lock washers of the same internal diameter but of different external diameter. This is made possible by providing a plurality of slots 10 in the lock washer 5 which slots permit the tongue 6ª to be bent into engagement with screw heads of different sizes. For instance, the lock washer shown in Fig. 3 may be employed for fastening a screw having a head 11 of small size thereon, as shown in Fig. 2, or the said lock washer may be employed for fastening a screw having a shank of the same diameter as that of the former but having a comparatively large head 12 thereon, as illustrated in Fig. 4. The slots 10 virtually result in the provision of what may be termed an adjustable tongue 6ª, the end of which tongue may be cut off if desired when the washer is employed in connection with a small-headed screw. It is not important that the annular portion of the locking device should be the same size as the head of the screw but said annular portion need only approximate the size of the latter. However, it is essential that the tongue 6ª should be adapted to securely engage screw heads of different sizes and that end is attained by the provision of slots 10 in the washer.

The construction shown in Fig. 5 is similar to that illustrated in Fig. 1 except that a slot 9ª is provided in the side of the plate 3 instead of the opening 9 of Fig. 1.

In the construction illustrated in Figs. 6 and 7 I have shown the lock washer of my invention applied to the screw-bolt 13 which is employed in fastening a pair of plates 14 and 15 together. The said screw-bolt is similar to screw 1 being provided with slots 8 formed in the flange 16 thereon with one of which the tongue 6ª of the locking device is adapted to engage, and the outer edge of the under side of the head of the said screw-bolt is rounded in the same manner as the screw 1. The screw-bolt is provided with a square projection 17 for a wrench, as shown, instead of the slot 18 of screw 1. The manner in which the locking device of my invention is assembled in conjunction with the screw-bolt 13 and plates 14 and 15 will be obvious, it being noted that the tongue 6 of the locking device will be projected into the opening 9 formed in the plate 14.

It will now be seen that I have provided a lock washer which is adapted to replace a large number of lock washers of different sizes and which may be employed in securing nuts, bolts, screws and screw-bolts against rotation in their stead. It also will be apparent that I have provided a novel form of screw or bolt head which is adapted to prevent the fracture and breaking of the tongue of the lock washer which is bent into engagement with said screw head.

This application contains matter found in my co-pending application, Serial Number 237,209, filed December 2, 1927.

Having thus described my invention, what I claim and desire to secure by Letters Patent is:

1. In combination with two members which are secured together, both members having openings therethrough, one of the said openings being tapped, the latter member having an opening therethrough in spaced relation to the said tapped opening, a headed screw adapted to clamp and hold the said members in united relation to each other, the outer portion of the under side of the head of said screw being rounded upwardly and outwardly throughout the entire peripheral extent thereof, the flange of the said head being provided with a series of notches in the edge thereof, a locking device interposed between the head of said screw and the adjoining one of the said members which are clamped and held together by the said screw, the said locking device comprising a central portion having an opening therethrough, and tongues extending outwardly from said central portion, one of the said tongues being in engagement with the second mentioned opening and the other of said tongues being of sufficient length to permit the manipulation thereof into engagement with one of the notches in the flange of the said head to positively lock the screw against rotation.

2. In combination with two members which are secured together, a headed screw, the outer portion of the under side of which is rounded throughout the entire peripheral extent thereof, the head of the said screw being provided with a plurality of notches in the edge thereof, and a locking device interposed between the head of said screw and one of said members, said locking device comprising an annulus having a tongue connected thereto intermediate the inner and outer edges thereof, said tongue being of sufficient length to permit manipulation thereof into engagement with the rounded portion of the said screw head and with one of said notches, and a second tongue provided on said annulus adapted to positively prevent rotation between the screw and one of said members.

3. In combination with two members which are secured together, both members having openings therethrough one of the said openings being tapped, the latter member having a groove formed therein in spaced relation to the said tapped opening, a headed screw adapted to clamp and hold the said members in united relation to each other, the outer portion of the under side of the head of said screw being rounded upwardly and outwardly throughout the entire peripheral extent thereof, the said head being provided with a plurality of notches in the edge thereof, a locking device interposed between the head of said screw and the adjoining one of said members, said locking device comprising an annulus having a plurality of tongues extending outwardly therefrom, one of said tongues being connected to said annulus at a point intermediate the inner and outer edges thereof and being of sufficient length to permit the said tongue to be bent into engagement with the upwardly and outwardly rounded portion of the under side of said screw head and with one of said notches, and the other of said tongues being adapted to be bent into the groove formed in said members whereby rotation of said screw is positively prevented.

In testimony that I claim the foregoing as my invention, I have hereunto signed my name this 31 day of May, A. D. 1928.

WILLIAM J. GIBBONS.